United States Patent [19]
Koenig

[11] Patent Number: 5,373,923
[45] Date of Patent: Dec. 20, 1994

[54] ROTARY MOTOR WITH COUNTERBALANCED TORQUE ARM

[76] Inventor: Larry E. Koenig, 4425 Marketing Pl., Groveport, Ohio 43125

[21] Appl. No.: 835,809

[22] Filed: Feb. 14, 1992

[51] Int. Cl.$^5$ .............................. F16F 9/22; F16F 9/26; F16F 15/16
[52] U.S. Cl. .................... 188/382; 188/303; 92/8; 248/562; 241/101.2; 74/607
[58] Field of Search ............. 248/562, 636, 638; 267/137, 186, 122; 241/101.2, 260.1; 74/607; 92/8; 188/302, 303

[56] References Cited

U.S. PATENT DOCUMENTS

| | | |
|---|---|---|
| 4,509,701 | 4/1985 | Jack et al. . |
| 4,679,464 | 4/1987 | Castellani .................. 74/788 |
| 4,719,942 | 1/1988 | Hayner . |
| 4,752,062 | 6/1988 | Domenichini . |
| 4,759,262 | 7/1988 | Hay, II ...................... 92/8 |
| 4,800,802 | 1/1989 | Rebman .................... 92/61 |
| 4,801,099 | 1/1989 | Reinhall .................. 241/101.2 |
| 4,872,702 | 10/1989 | Medley . |
| 4,931,229 | 6/1990 | Krimmel et al. . |
| 4,951,884 | 8/1990 | Koenig .................... 241/101.2 |

Primary Examiner—Mark Rosenbaum
Assistant Examiner—Kenneth J. Hansen
Attorney, Agent, or Firm—Thompson, Hine and Flory

[57] ABSTRACT

A rotary motor with a counterbalanced torque arm adapted to be mounted within an auger housing. The torque arm is mounted on the stationary cylinder block of the motor which extends radially outwardly from the access of the cowling and is attached to the auger housing. The torque arm includes a pair of diametrically opposed torque arm members which support pairs of cylinders. The cylinders engage the housing and are interconnected such that diametrically opposed pairs of cylinders are in fluid communication. Accordingly, rotational torques exerted on the torque arm by the cylinder block, for auger screw rotation both in the clockwise and counterclockwise directions, are born equally by the opposing torque arm members.

7 Claims, 4 Drawing Sheets

ROTARY MOTOR WITH COUNTERBALANCED TORQUE ARM

BACKGROUND OF THE INVENTION

The present invention relates to rotary motors, and, more particularly, to rotary hydraulic motors which drive a cantilevered shaft.

Rotary auger shredders, such as the auger shredder disclosed in Koenig U.S. Pat. No. 4,253,615, include a housing which is divided into a grinding chamber and a motor cabinet. A rear wall separating the grinding chamber and cabinet supports a bearing on which is mounted a radial piston hydraulic motor and an auger screw which is cantilevered into the grinding chamber. The hydraulic motor includes a stationary part and a rotating part which is bolted to a mounting plate or disc which supports the screw.

The stationary motor part is connected to a hydraulic pump which supplies pressurized hydraulic fluid to drive the motor. The stationary part is connected to the housing framework within the cabinet by a single torque arm which extends radially from the rotational axis of the motor. The torque arm is attached to the housing by a link which is pivotally connected at one end to a clevis mounted on the housing, and at its other end to a clevis formed in the end of the link arm.

A problem with such a design is that torque forces transmitted to the link arm through the motor are unbalanced and create unwanted reactive radial loads, which may shorten the life of the motor and bearing. Further, the link connection between the torque arm and frame lacks means for absorbing shocks which may be created during reversal of the motor and auger screw rotation, or which occur when the auger encounters a relatively hard object such as a block of metal or hardened concrete. Accordingly, there is a need for an auger shredder having a motor and torque arm assembly which minimizes bending moments applied to the hydraulic motor and bearing, and which is capable of absorbing shocks encountered by the auger shredder during operation, and is balanced to minimize the radial reactive load occurring within the motor and bearing.

SUMMARY OF THE INVENTION

The present invention is a rotary motor having a counterbalanced torque arm which is connected to the motor housing such that reactive radial loads normally generated during operation of such an motor are substantially eliminated. Further, the torque arm of the present invention includes opposing pairs of hydraulic cylinders which are interconnected to distribute torque loads evenly between the ends of the torque arm and the housing, and in addition, absorb shock loads imparted to the auger drive motor. The invention is used with a rotary auger of the type having a housing, a drive motor having a stationary part and a rotary part attached to a bearing mounted on a wall of the housing, and an auger screw mounted on the bearing for rotation relative to the housing and stationary part of the motor.

The torque arm is attached to the stationary part of the motor and extends radially outwardly from the axis of rotation of the auger screw. The torque arm preferably includes a pair of opposing arm members which are oriented diametrically opposite to each other and are connected to the wall separating the grinding chamber of the auger shredder and the motor cabinet.

Also in the preferred embodiment, the torque arm members of the invention each include pairs of opposing hydraulic cylinders which provide the connection between the torque arm and the housing. Each of the cylinders is in fluid communication with a diametrically opposite cylinder in the opposing arm member. Consequently, for both clockwise and counterclockwise rotation of the auger and motor, the resistive torque borne by the torque arm will be transmitted to the housing through a pair of cylinders which are interconnected to equalize the pressure force transmitted from opposite ends of torque arm to the housing. Further, the use of the cylinders serves to cushion shock loading.

Accordingly, it is an object of the present invention to provide a counterbalanced torque arm for rotary machines which minimizes the reactive radial load exerted on the rotary machine by the torque arm during operation of the auger; a rotary motor in which shock loads transmitted to the housing enclosing the motor by the torque arm are minimized; a rotary motor in which the torque arm connecting the motor stationary part and rotary part is balanced to transmit torque loads evenly between the two torque arm members; a rotary motor in which the torque arm comprises a pair of diametrically opposed torque arm members which are connected to the housing enclosing the motor by cylinders which are interconnected to balance the loads transmitted; and a rotary motor having a torque arm which is relatively simple to construct, attach, detach and maintain.

Other objects and advantages will be apparent from the following description, the accompanying drawings and appended claims.

BRIEF DESCRIPTION OF THE DRAWING

FIG. 4A is a detail of an alternate embodiment of the mounting boss of the embodiment of FIG. 4.

DETAILED DESCRIPTION

Figure 1:
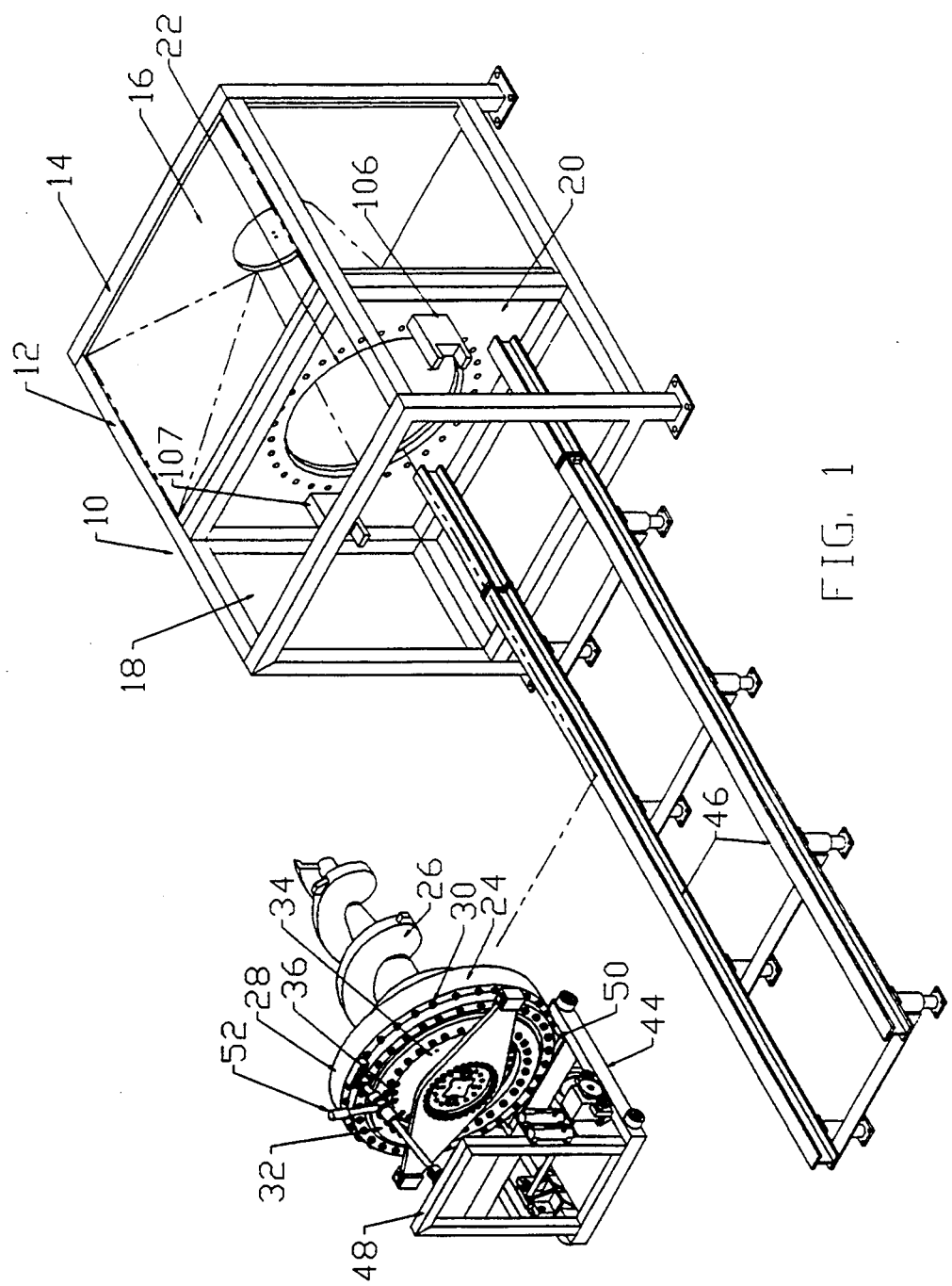
FIG. 1 is a somewhat schematic, exploded perspective view of a rotary auger embodying the torque arm design of the present invention.

As shown in FIG. 1, the rotary motor of the present invention is incorporated within a rotary auger, generally designated 10, which includes a housing 12 having a superstructure or framework 14. The housing includes a grinding chamber 16 and a motor cabinet 18. The motor cabinet 18 typically is enclosed, but is shown open in FIG. 11 for purposes of clarity. A wall or bulkhead 20 separates the grinding chamber 16 from the motor cabinet 18 and is attached to the framework 14.

The bulkhead 20 includes a circular central opening 22 which receives a circular bearing 24. The bearing 24 supports and is attached to a tapered auger screw 26, such as the auger screw disclosed in U.S. Pat. No. 5,108,040, the disclosure of which is incorporated herein by reference. The bearing 24 includes an outer race 28 which is attached to the bulkhead 20 by bolts 30, and an inner race 32.

Figure 2:
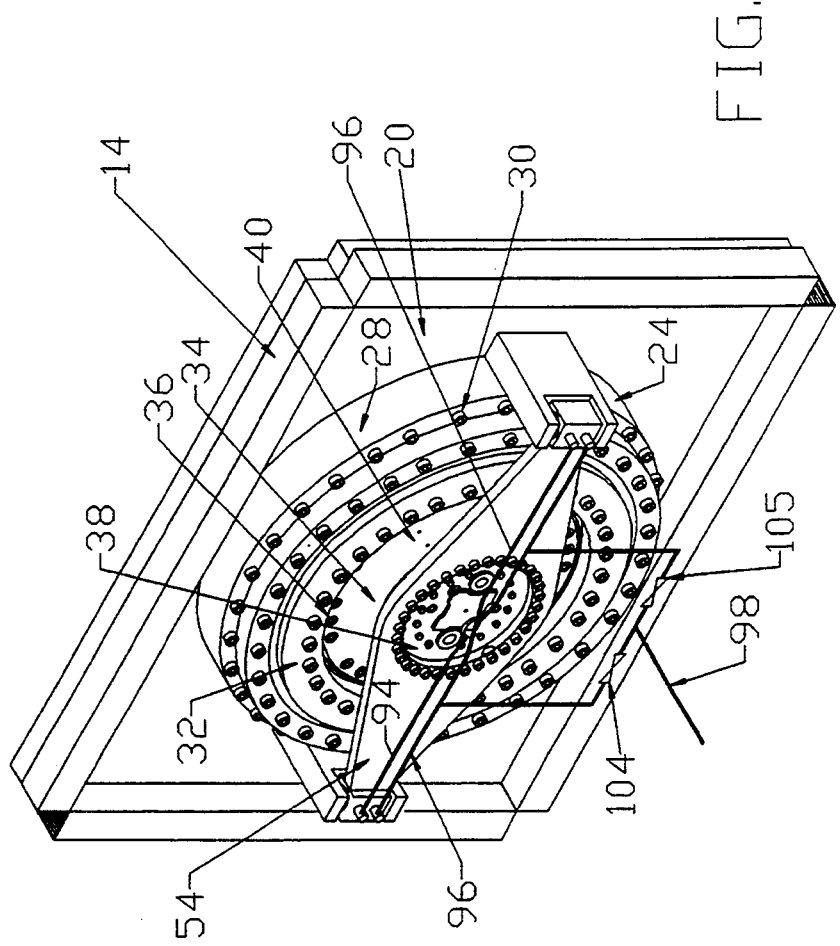
FIG. 2 is a perspective detail of the rotary auger of FIG. 1 showing the torque arm mounted on the motor and bulkhead.
Figure 4:
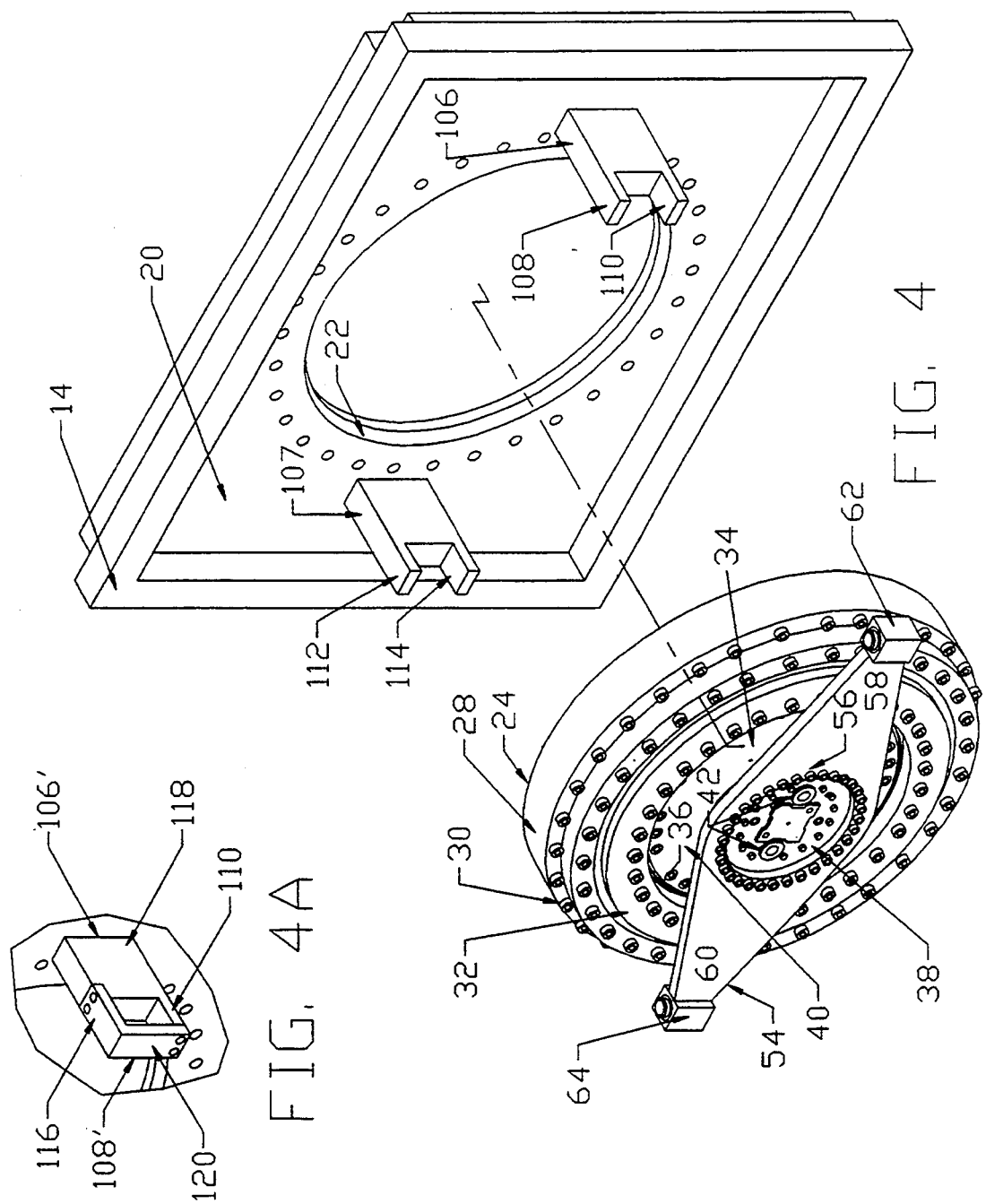
FIG. 4 is an exploded, perspective view of the detail of FIG. 2.

As shown in FIGS. 1, 2 and 4, a hydraulic motor, generally designated 34, is attached to the inner race 32 by bolts 36 (see also FIG. 2). The motor is of the radial piston type, having a central, stationary cylinder block part 38 and an outer, rotary housing or cowling part 40. It is the outer cowling 50 which is attached to the inner race 32 by bolts 36. In operation, the cylinder block 38 remains stationary and the cowling 40 rotates, thereby rotating the inner race 32 of the bearing 24 and the auger screw 26 (see FIG. 1). The cylinder block 38 includes hydraulic oil ports 42 to power the motor 34. The ports 42 are connected to supply and return lines (not shown) from a hydraulic pump mounted within the cabinet 18 (see FIG. 1).

As shown in FIG. 1, the bearing 24 is mounted on a carriage, generally designated 44, which rides on the lower flanges of rails 46 extending rearwardly from the cabinet 18 and facilitates the assembly and disassembly of the auger 10. The carriage includes a support frame 48 having a cradle 50 that supports the outer race 28 of the bearing and includes a screw jack 52 which is attached to the upper portion of the outer race so that the bearing and auger screw 26 can be adjusted to engage central opening 22 for attachment and removal for maintenance.

As shown in FIGS. 2 and 4, a torque arm 54 is attached to the cylinder block 38 by a ring of bolts 56 and includes a pair of diametrically opposed, unitary arm members 58, 60. Arm members 58, 60 terminate in mounting blocks 62, 64. Mounting blocks 62, 64 include pairs of opposing cylinders 66, 68 and 70, 72, respectively (see FIG. 5). It is within the scope of the invention to provide a motor with a stationary case and a rotating central shaft. In such case, the torque arm would be attached to the stationary case.

Figure 3:
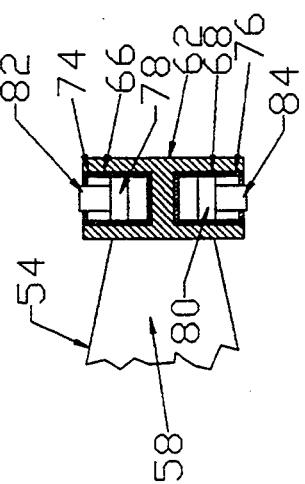
FIG. 3 is a detail of the auger of FIG. 1, showing a mounting block in section.

As shown in FIG. 3 for mounting block 62, cylinders 66, 68 include sleeves 74, 76 which enclose pistons 78, 80 that have protruding stub shafts 82, 84, respectively. Although shown only schematically in FIG. 5, the structure for cylinders 70, 72 is the same as for cylinders 66, 68 in mounting block 64. Cylinder 70 includes piston 86 and stub shaft 88, and cylinder 72 includes piston 90 and stub shaft 92.

Figure 5:
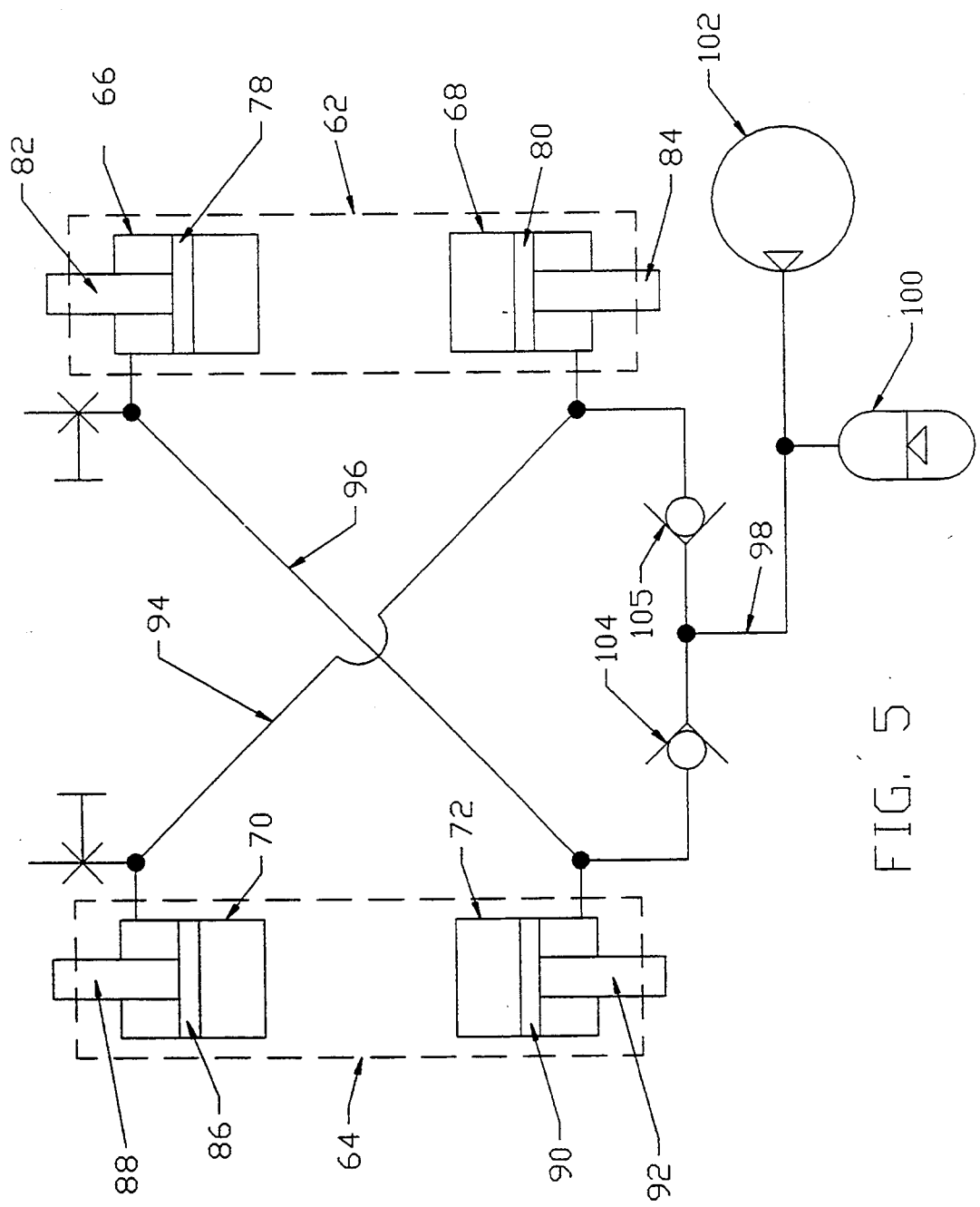
FIG. 5 is a hydraulic schematic of the cylinder circuit of the torque arm of FIG. 1.

As shown in FIGS. 2 and 5, the cylinders 68 and 70 are interconnected by hydraulic line 94, and cylinders 66 and 72 are interconnected by hydraulic line 96. Hydraulic lines 94, 96 are fed by supply line 98 which is connected to a hydraulic accumulator 100 and hydraulic pump 102. Check valves 104, 106 are connected between supply line 98 and lines 96 and 94, respectively, to prevent reverse flow of fluid during operation.

As shown in FIGS. 2 and 4, the bulkhead 20 includes bosses 106, 107 which project into the motor cabinet 18 (see FIG. 1) and include upper and lower cam plates 108, 110, 112, 114, respectively. Cam plates 108, 110 are spaced to receive mounting block 62 between them, and similarly, cam plates 112, 114 are spaced to receive mounting block 64 between them. The spacing is such that stub shafts 82, 84 of cylinder 66, 68 engage cam plates 108, 110, and stub shafts 88, 92 engage cam plates 112, 114. Accordingly, the only contact between the torque arm 54 and bulkhead 20 is the camming engagement between the stub shafts 82, 84, 88, 92 and their respective cam plates 108, 110, 112, 114, respectively.

As shown in FIG. 4A, an alternate boss 106' includes an L-shaped locking member 116 which is removably bolted to a base 118 at an upper end rand to the end of the lower cam plate 110 at a lower end. Locking member 116 includes an upper cam plate 108' and a transverse portion 120 interconnecting the upper and lower cam plates 108', 110. Although not shown, boss 107 preferably is modified in the same manner. Accordingly, maintenance and repair of the cylinders 66, 68, 70, 72 is facilitated since removal of the locking member of the bosses allows the torque arm 54 to be rotated out of engagement with the bosses to expose the cylinders.

In operation, material to be ground is deposited through the open top of the grinding chamber 16 and the motor 34, powered by pump 102, is actuated to rotate the inner bearing race 32 which, in turn, rotates screw 26. The reactive force encountered by the screw 26 in grinding the material in chamber 16 has a tendency to rotate the cylinder block 38 of the motor 34 in a direction counter to the direction of rotation. This reaction force is transmitted from the motor 34 to the bulkhead 20 through the torque arm 54.

With the screw configuration shown for screw 26 in FIG. 1, the initial rotation will occur in a clockwise direction, creating a counterclockwise reaction force which will tend to make the torque arm 54 rotate in a counterclockwise direction. This causes the cylinders 66 and 72 to be compressed against their respective cam plates 108, 114, which pressurizes the cylinders. This pressurizing causes hydraulic fluid in line 96 to equalize the pressure exerted upon the cylinders as a result of the compressive force exerted between the mounting blocks 62, 64 and their respective bosses 104, 106.

When the screw 26 is reversed in rotation, which may be a part of a normal programmed operation, the reverse occurs; namely, the torque arm 54 is urged in a clockwise direction so that cylinders 68, 70 are pressurized by the compressive force exerted between the mounting blocks 62, 64 and cam plates 110, 112 of bosses 104, 106, respectively. This causes fluid to flow through line 94 until the cylinders 68, 70 are pressurized at equal pressures. Jolts and shocks sustained by the auger screw 26 during operation are absorbed somewhat by the hydraulic system shown in FIG. 5, since the hydraulic fluid has a measure of compressibility.

In a preferred embodiment, the lines 94, 96 are pressurized by pump 102 to approximately 250 psi. These lines 94, 96 preferably are made of stainless steel tubing.

While the form of apparatus herein described constitutes a preferred embodiment of this invention, it is to be understood that the invention is not limited to this precise form of apparatus and that changes may be made therein without departing from the scope of the invention.

What is claimed is:

1. For use with a rotary motor of a type having a rotating part for transmitting torque and a stationary part, a counterbalanced torque arm system comprising:
   a counterbalanced torque arm mounted on said stationary part and including a first and a second arm means;
   two pairs of discrete opposing cylinder means, each of said pairs being positioned in opposing relation within a different one of said arm means, and each of said cylinder means having a stub shaft protruding from an associated one of said arm means, said shafts being shaped to connect said arm means to associated stationary support structure, whereby reactive radial loads from said rotary motor are transmitted through said torque arm, said cylinders and said stub shafts to said associated stationary support structure.

2. The torque arm system of claim 1 wherein said arm means includes means for distributing said reactive radial loads evenly between said arm means.

3. The torque arm system of claim 2 wherein said distributing means includes means for interconnecting said cylinder means such that working fluid is exchanged between said cylinder means on different ones of said arm means.

4. The torque arm system of claim 3 wherein said arm means includes mounting blocks attached to said arm means; and said cylinder means includes pairs of opposing cylinders mounted within said mounting block such that only stub shafts thereof protrude from said mounting blocks.

5. The torque arm system of claim 4 wherein said cylinder means of said first arm means are interconnected with diametrically opposite ones of said cylinder means on said second arm means, whereby reactive radial loads are equalized between said arm members.

6. The torque arm system of claim 5 wherein said arm means are positioned diametrically opposite to each other relative to a rotational axis of said motor.

7. The torque arm system of claim 1 further comprising means for fluid pressurizing said cylinder means such that said stub shafts independently extend to contact said associated support structure.

* * * * *